July 14, 1970    R. A. SLAY    3,520,378
MOTOR-DRIVEN WHEELED VEHICLES
Filed April 5, 1968    4 Sheets-Sheet 1

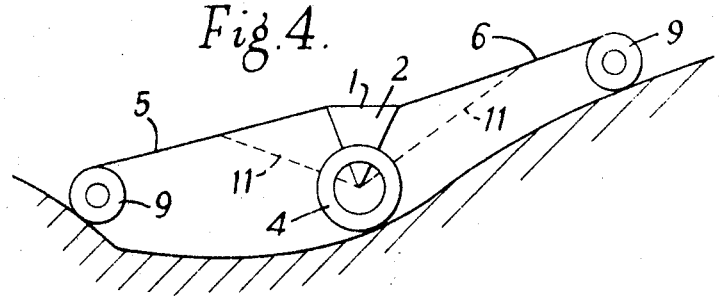
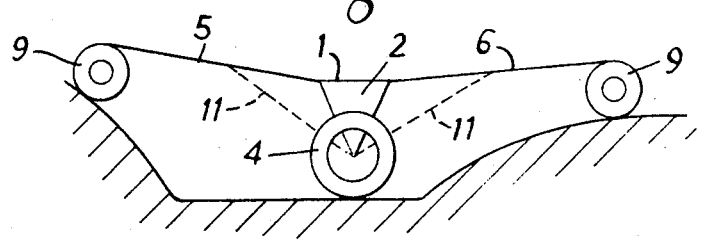
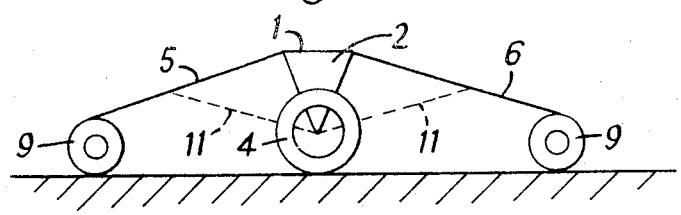
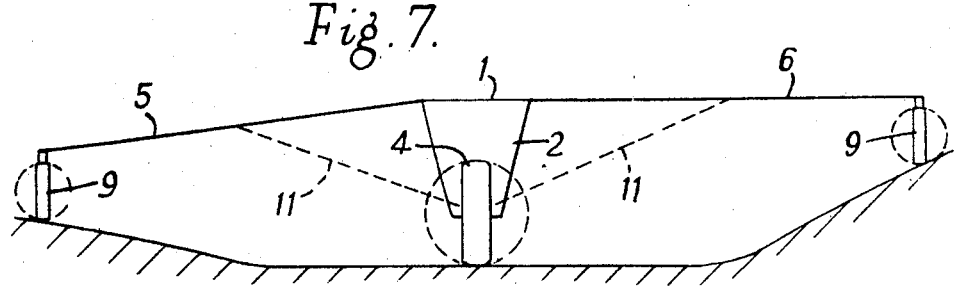

July 14, 1970   R. A. SLAY   3,520,378
MOTOR-DRIVEN WHEELED VEHICLES
Filed April 5, 1968   4 Sheets-Sheet 3
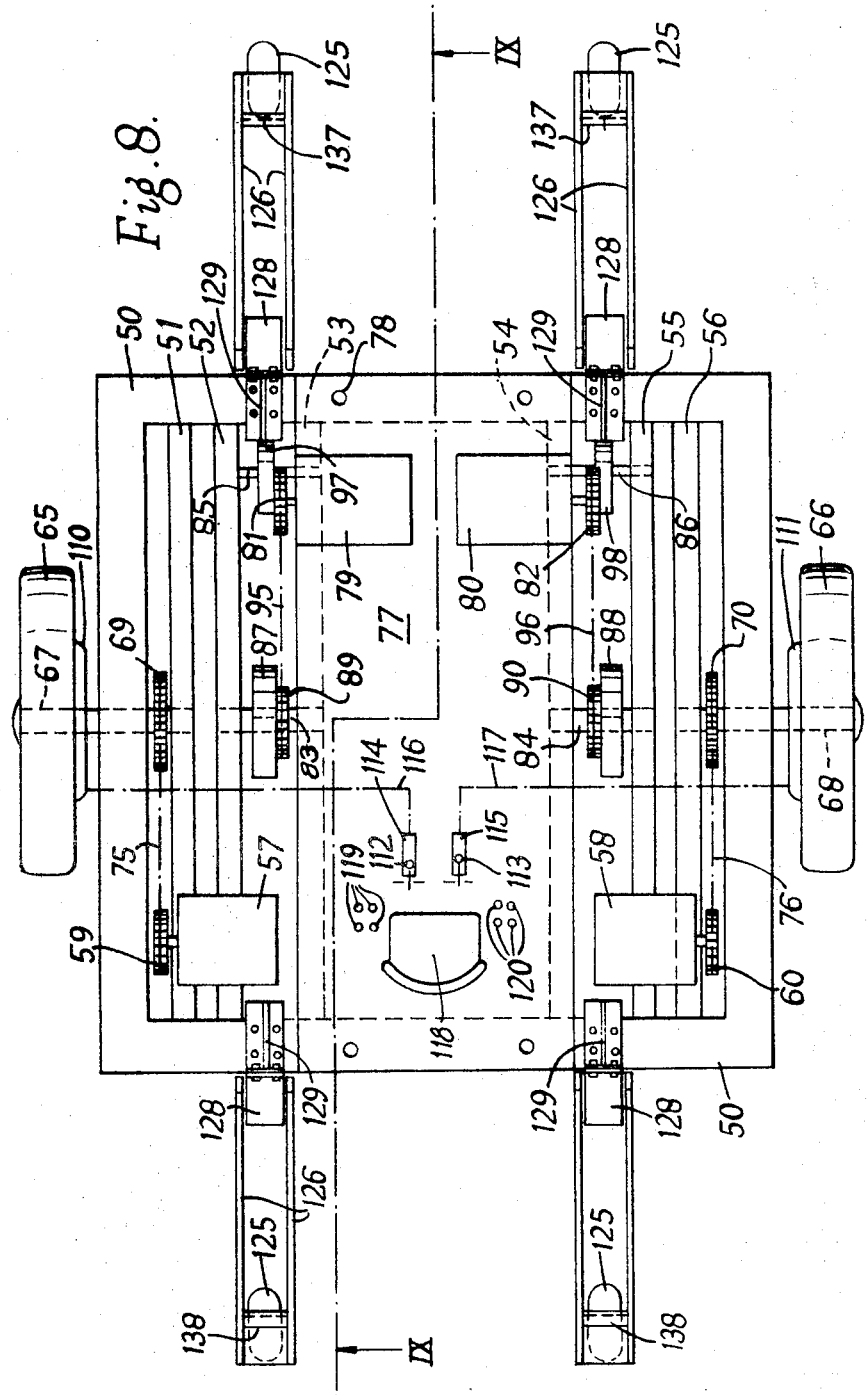

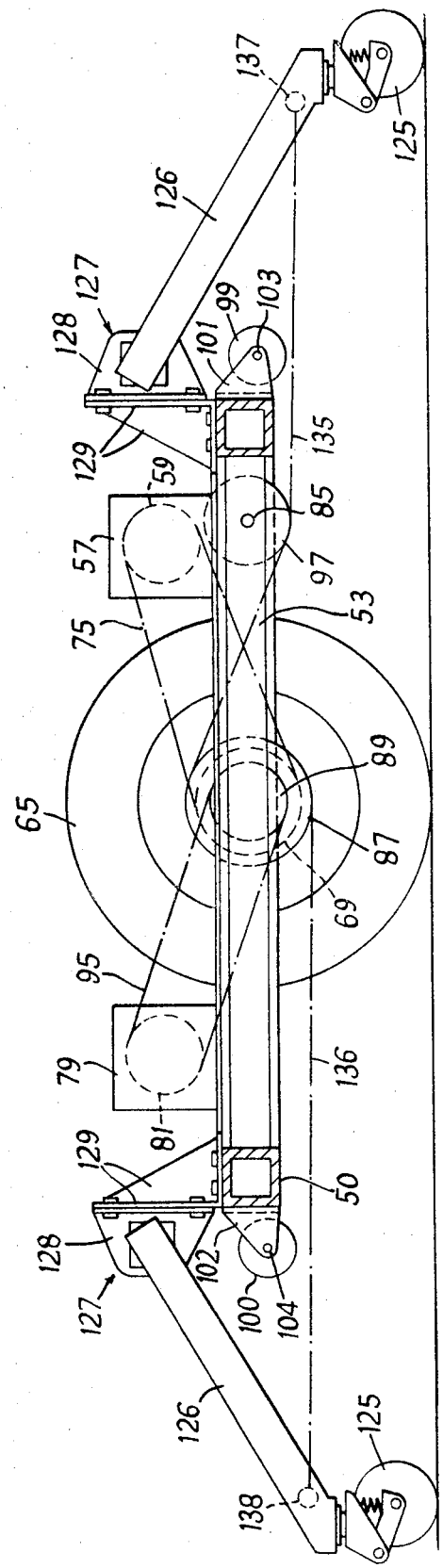

United States Patent Office 3,520,378
Patented July 14, 1970

3,520,378
MOTOR-DRIVEN WHEELED VEHICLES
Reginald Arthur Slay, Annables, Sliema Road,
Kappara, Malta
Filed Apr. 5, 1968, Ser. No. 719,169
Int. Cl. B62d 61/00
U.S. Cl. 180—21                                   3 Claims

ABSTRACT OF THE DISCLOSURE

A motor-driven wheeled vehicle having a platform which is stabilised by two or more castor-carrying outrigger members, it being substantially impossible for said vehicle to turn over on to one side or the other regardless of the terrain over which it is driven. The vehicle is provided with winch-operated jacking means whereby the drive wheels, or one of them, can with ease be lifted off the ground.

---

This invention relates to motor-driven wheeled vehicles and consists in an improvement in or modification of the invention claimed in my U.S. Pat. No. 3,404,746.

The present invention will now be more particularly described with reference to the accompanying diagrammatic drawings, in which.

Figure 1:
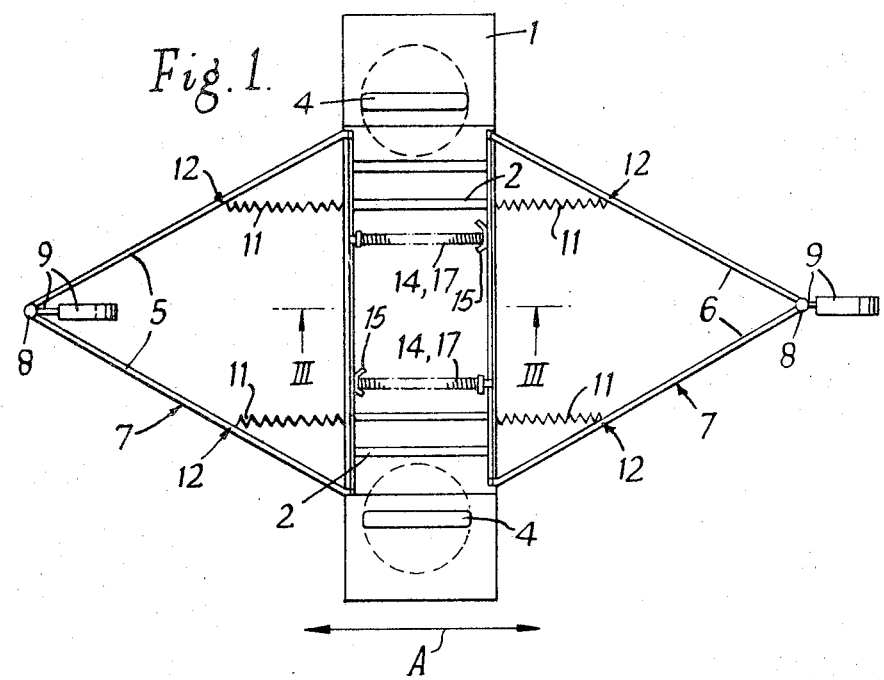
FIGS. 1 and 2 illustrate in plan and in side elevation, respectively, one embodiment of the invention.
Figure 2:
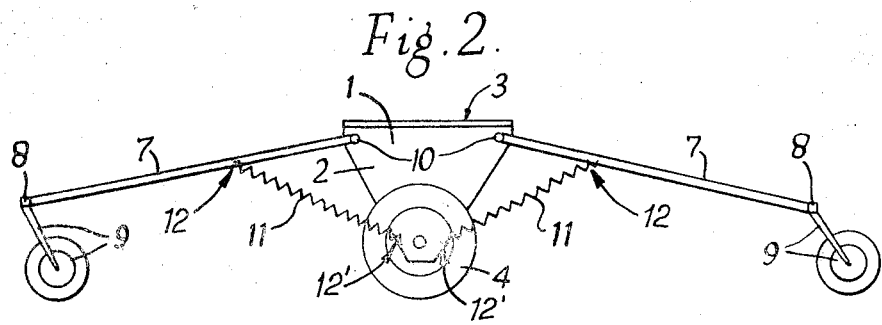

FIGS. 4, 5, 6 and 7 illustrate elevations showing various position relationships of castor and driving wheels and chassis member when traversing ground surfaces of various different contours; and FIGS. 8 and 9 illustrate an alternative embodiment of the present invention, FIG. 8 illustrating a diagrammatic plan view of said alternative embodiment and FIG. 9 illustrating a section on the line IX—IX of FIG. 8.

Referring to FIGS. 1 to 7, a motor-driven wheeled vehicle is shown which includes a chassis member 1 having vertical plates 2 extending downwardly from a platform part 3, said plates 2 being in parallel and spaced-apart relationship. Motor-driven ground-bearing driving wheels 4 adjacent to the respective ends of the chassis member 1 are incorporated in assemblies carried by said chassis member, said assemblies being arranged for pivotal movements about vertical axes for steering of the vehicle, said movements being effected by a control gear (not shown) but which may be the same as that described with reference to the drawings of the aforesaid U.S. Pat. No. 3,404,746 in relation to the or each driving wheel 50 as shown therein. Provision is made for varying the speed relationship of the driving wheels, for example, by variation of the speeds of driving motors individual to said wheels.

Fore and aft outrigger members 5, 6 extend from the chassis member 1. Each of these members comprises a pair of mutually converging outrigger arms 7. These arms 7 meet at the vertical pivot axis 8 of a castor wheel assembly 9 which has unrestricted swivel movement about said axis 8. In respect of each of the outrigger members 5, 6, the two arms 7 thereof are both secured to a common shaft 10 mounted in said chassis plates 2 for turning movement, the two arms 7 of the one member 5 or 6 thus being adapted to move upwardly or downwardly in an arc as a unit, the shaft 10 being mounted in an upper part of each of the associated plates 2.

That end of each of the outrigger members 5, 6 which carries the castor wheel assembly 9 is urged downwardly by tension springs 11, each of said springs having one end connected at 12 to the associated arm 7 and having its other end anchored to a lower part of the associated plate 2 and 12'. Where connected at 12 to arm 7, the position of connection is adjustable along said arm for variation of spring tension and extent of leverage afforded.

Figure 3:
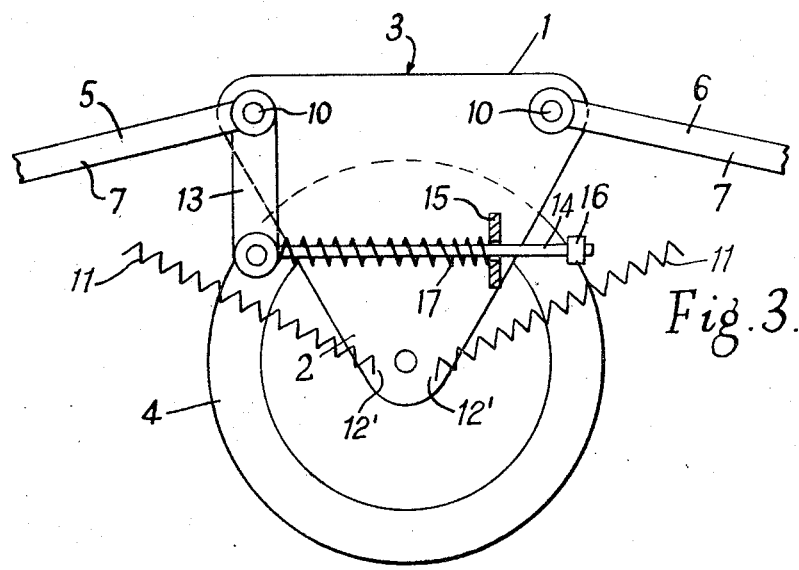
FIG. 3 illustrates, on a larger scale than that employed in FIGS. 1 and 2, a section on line III—III in FIG. 1.

On each shaft 10 there is also secured a secondary arm 13 (FIG. 3) which extends vertically downwardly therefrom. To the lower end of this arm 13 as seen in FIG. 3 there is pivotally attached a horizontal rod 14 which is adapted to slide through a hole therefor in a cheek 15 which is a fixed part of chassis member 1, this cheek 15 being (with respect to arm 13) on the far side of the common axis of rotation of the driving wheels 4 when said wheels are positioned for fore or aft propulsion of the vehicle, namely, in one or other of the directions indicated by the double-headed arrow A in FIG. 1. As will be evident from a comparison of FIGS. 2 and 3, the rod 14 is disposed above the level (in relation to ground level) of the positions of anchorage of the other ends of said springs 11 to the chassis plates 2 and also above the level (in relation to ground level) of said common axis of rotation of said wheels 4. Each rod 14 projects beyond the associated cheek 15 to the extent required to allow the upwards swinging movement of the associated outrigger member 5 or 6 with resultant sliding of the rod 14 concerned through the hole in the cheek 15 concerned, a stop 16 on the free end of said rod 14 serving to limit the upwards swinging movement of the outrigger member concerned when said stop 16 comes into contact with said cheek 15. In the case of each rod 14, a coiled compression spring 17 encircles the rod 14 and has one end thereof bearing against the associated arm 13 and the other end thereof bearing against the associated cheek 15.

It will be understood that the two springs 17 exert thrusts in mutulaly opposite directions on the said cheeks 15 and thus on the chassis member 1 to oppose any tendency of said chassis member to tilt in a clockwise direction or in an anti-clockwise direction respectively about the common axis of the wheels 4 when said wheels are positioned, as aforesaid, for fore and aft propulsion.

The springs 11 may be adjusted to give, by their relationship and co-operation with one another and with said springs 17, a correct balancing effect for the chassis member 1. Thus, the outrigger members 5 and 6 are free to rise and fall in arcs when the vehicle is negotiating uneven ground and, at the same time, the compression springs 17 not only act to maintain stability of the said chassis member 1 but also serve as shock-absorbing torque reaction members in respect of propelling thrust applied by the motors to the wheels 4.

Referring now to FIGS. 8 and 9, there is illustrated a motor-driven wheeled vehicle which includes a chassis which consists of a rectangular (in plan) frame 50 of box section and transversely spaced members 51, 52, 53, 54, 55 and 56 each end of each of which is fixedly secured (as by welding) to the frame 50. Mounted upon the members 51, 52 and 55, 56 are two reversible motors 57, 58, respectively, whose output shafts carry sprocket wheels 59, 60, respectively. A pair of wheels 65, 66 is provided, one wheel at each end of the chassis, said wheels having respectively axles 67, 68 journalled for rotation in the ends of said chassis and in the members 51, 56 respectively. The axles 67, 68 have keyed thereto sprocket wheels 69, 70 which are drivingly connected to the sprocket wheels 59, 60 by chain-belts 75, 76.

As best seen in FIG. 8, a deck 77 is fixed to the frame 50 by bolts 78 and supports two reversible motors 79, 80 whose output shafts carry sprocket wheels 81, 82. Fixed shafts 83, 84 extend between the members 52, 53 and 54, 55, respectively, as also do two more fixed shafts 85, 86. Cable-carrying drums 87, 88 and integral, fixed sprocket wheels 89, 90 are mounted for rotation about the shafts 83, 84 respectively and are prevented from axial movements along those shafts in any convenient manner. The sprocket wheels 81, 82 and 89, 90 are drivingly connected by chain-belts 95, 96 respectively. The cable-carrying drums 87, 88 will hereinafter be called winches.

Idler pulley wheels 97, 98 are mounted on the shafts 85, 86 for rotation freely about the axes of said shafts and are prevented from axial movements therealong in any convenient manner. Similarly, idler pulley wheels 99, 100 carried by bifurcated brackets 101, 102 which are for example welded to the frame 50 are mounted for free rotation about the axes of respective spindles 103, 104 carried by the free end of the bifurcated brackets. The purpose of these three pairs of idler pulley wheels will become apparent hereinafter, three pulley wheels being in line with one another longitudinally at one side of the deck 77 (namely, wheels 100, 97 and 99) and three pulley wheels being in line with one another at the other side of said deck (namely, wheels 100, 98 and 99).

The wheels 65, 66 have brakes 110, 111, respectively, which have been illustrated as being hydraulically operated by operation of brake pedals 112, 113 which are associated with the customary cylinders 114, 115 and hydraulic pressure lines 116, 117 connected between said brakes 110, 111 and said cylinders 114, 115.

The deck also supports a seat 118 for the driver and a series of controls which are collectively designated 119, 120 but which are not further to be described in detail except to say that said controls include a gear lever for each of the motors 57, 58 and a clutch-control lever for each of said motors 57, 58 whereby each of the wheels 65, 66 can be selectively isolated from its driving motor and a clutch-control lever for each of the motors 79, 80 whereby each of the winches 87, 88 can be selectively controlled by the driver when the respective one of the motors 79, 80 has been started.

The vehicle is held in a balanced condition at all times by four identical ground-contacting castor wheels 125 which are carried on those ends of bifurcated outrigger members 126 which are remote from the frame 50. The other ends of the members 126 are connected to shock-absorbers indicated generally by the reference numeral 127, said shock-absorbers being constructed in accordance with the well-known Neidhart system which is disclosed for example in United Kingdom patent specification No. 652,266 and in many technical journals such as "Rubber Developments" volume 13, No. 3 dated 1960 and volume 18, No. 2 dated 1965, published by the Natural Rubber Producers' Research Association, Welwyn Garden City, Hertfordshire, England. Detailed description of such Neidhart shock-absorbers or vehicle suspension systems is unnecessary and it is considered to suffice to say that each shock-absorber 127 includes a housing 128 mounted on a bracket 129 which is itself mounted on the frame 50, said housing having a cavity therein which is square in section (as can be seen in FIG. 9) and which has rounded corners over its operating length, said cavity having disposed at each of said rounded corners a rubber unit. Each rubber unit, as made and vulcanised, is of circular section and each rubber unit becomes deformed into an approximately triangular section by the insertion into the cavity in the housing 128 of a square-section shaft (not shown) or of a shaft which is of so-called paddle-section. Such shaft is carried by and is fixedly secured to said other end of the outrigger member 126, such shaft extending in fact between the free ends of the limbs which constitute the bifurcated outrigger member 126. Thus, each of the outrigger members 126 is free to be moved in an arcuate manner about the axis of rotation of said square-section or paddle-section shaft with resultant subjection of the four rubber units within the housing 128 to rolling compression which builds up rapidly. It is thought that, in general, as far as a wheeled vehicle is concerned which is intended for use on uneven terrain, it would be sufficient to employ Neidhart shock-absorbers or suspension systems of the type having square-section shafts operating on said rubber units since apparently, the permitted rotational movements are between 30 and 35 degrees in either direction of rotation but it might be desirable in certain instances to employ such shock-absorbers or suspension systems of the type having the so-called paddle-section shafts since, apparently, the permitted rotational movement of said shafts is of the order of 60 degrees in one direction only with a bump-stop effect on full rebound.

The castor wheels 125 may be identical with those castor wheels described in said U.S. Patent No. 3,404,-746 and they may even be provided with brakes, if desired, as disclosed in said specification.

Referring to FIG. 9, there has been illustrated therein the manner in which the winches 87, 88 are adapted to be employed when the effect which is thereby obtainable is desired to be obtained. Each winch carries two oppositely wound lengths 135, 136 of cable, the ends of said lengths having, for example, hooks (not illustrated) at the free ends thereof which are adapted to engage spindles or shafts 137, 138 which are fixed by their ends to the two limbs of those bifurcated outrigger members 126 which are in line with one another fore and aft of the vehicle. If the motor 79 is started and the clutch-control therefor is actuated, the winch 87 will be operated to draw the castor wheels 125 towards one another, the cable length 135 running smoothly over the idler pulley wheels 97. When the rubber units in the two Neidhart shock-absorbers or suspension systems are not capable of undergoing further compression as a result of such movements of said wheels 125 towards one another, the wheel 65 will become progressively lifted off the ground. The same can be effected at the other side of the vehicle by appropriate operation of the winch 88. With both of the wheels 65, 66 clear of the ground and with the brakes applied to all four castor wheels 125, a stable platform will be available from which to accomplish work which necessitates a stable platform. Alternatively, operation of only one winch could lift the associated one of the wheels 65, 66 out of soggy ground which is effectively immobilising the vehicle, carefully regulated rotation of the other of the wheels 65, 66 being used to inch the vehicle past the obstruction presented by the soggy ground. Furthermore, if for any reason it were desired to eliminate all or a part of the springing effect which the Neidhart suspension systems provide (as for travel along so-called metalled road surfaces), the two winches could be appropriately operated to draw the fore-and-aft pairs of castor wheels 125 towards one another to the requisite extent.

It is not, of course, essential to employ Niedhart suspension systems. Such systems could be replaced by the well-known Flexitor suspension systems disclosed in United Kingdom patent specifications No. 676,098 and No. 676,190 and in many technical journals such as "Rubber Developments" volume 18, No. 3 dated 1965. A Flexitor suspension consists essentially of a trough-like shell fixed to the chassis of the vehicle and a shaft centrally located within said shell, a specially compounded rubber sleeve being bonded at its radially inner periphery to the shaft and at its radially outer periphery to said shell. A top plate which is placed over the open side of the trough-like shell before it is fixed to said chassis provides pre-compression of the rubber and improves the fatigue life thereof. An arm is fixed to the shaft and one end of said arm carries a ground-contacting wheel and hub on a stub axle. Load on the wheel causes the shaft to rotate relative to the shell thereby subjecting the rubber to torsional shear. Apparently, the permitted rotational movement of the arm relative to the shell is of the order of 35 degrees.

Other shock-absorbing mechanisms could, of course, be employed instead of the Neidhart or Flexitor systems, such for example as Andre Telecontrol shock absorbers and others, disclosed in text-books such as "Practical Automobile Engineering" published in the United Kingdom by Odhams Press Limited.

The purpose for which the pulley wheels 99, 100 are provided is to prevent fouling of the cable lengths 135, 136 by the frame 50 if the load being supported by the chassis (which could be decked to cover the motors 57, 58 and the winches 87, 88 and pulley wheels 97, 98 to form a load-supporting platform) were such that a straight line drawn from the shaft 137 tangential to the respective pulley wheel 97 or 98 on the one hand and/or from the shaft 138 tangential to the respective winch 87 or 88 on the other hand were to pass through any part of said frame. Such would be very likely to occur on very uneven terrain because an upwards arcuate movement of the wheel 125 at the left-hand side of FIG. 9 of as little as 15 degrees would (in the absence of the pulley wheel 100) bring the cable length 136 very close to the frame 50 whereas at the right-hand side of the vehicle shown in FIG. 9 arcuate upwards movement of the wheel 127 through about 12 degrees would bring the cable length 135 close to the frame 50 in the absence of the pulley wheel 99.

What I claim as my invention and desire to secure by Letters Patent of the United States is:

1. A motor-driven wheeled vehicle which includes, in combination, a chassis, vehicle propulsion power means mounted on said chassis, wheels journalled in said chassis for rotation about their common axis of rotation and adapted to contact the ground, drive transmission means interconnecting said wheels and said power means and operable to propel said vehicle along the ground, outrigger members each having two ends, one end of each outrigger member having a pivotal connection with said chassis and the other end thereof carrying a castor wheel, said castor wheel being adapted for contact with the ground and having freedom for rotation through 360 degrees in response to unevenness of said ground, spring devices connecting said outrigger members and said chassis to one another whereby said outrigger members are free to move upwardly or downwardly in an arcuate manner by virtue of said pivotal connection to said chassis and oppose any tendency of said chassis to tilt about said common axis of rotation of said wheels, said spring devices including at least one primary spring means for each outrigger member and at least one secondary spring means for each outrigger member, said primary spring means having two ends of which one is connected to a first location on said outrigger member and of which the other is connected to a first location on said chassis, said primary spring means urging the castor wheel carried by said outrigger member into contact with the ground, said secondary spring means being disposed between a second location on said outrigger member and a second location on said chassis which is further away from the ground than is said first location on said chassis, said second location on said chassis including a member fixed to said chassis and providing an abutment surface for said secondary spring means, said second location on said outrigger member and said second location on said chassis being spaced apart by a certain distance when said vehicle is at rest on level ground, said secondary spring means opposing any tendency of said second location on said outrigger member to decrease said certain distance between itself and said second location on said chassis as a result of torque applied to said wheels.

2. A vehicle as claimed in claim 1, wherein said second location on said outrigger member is on a secondary arm, said secondary arm being fast with said outrigger member and extending in a generally downwards direction from the axis of said pivotal connection between said outrigger member and said chassis.

3. A vehicle as claimed in claim 2, wherein said wheels are adjustable about a vertical axis through 90° whereby to enable said vehicle to move sideways in relation to either of the directions in which it was adapted to move before said wheels were so adjusted.

References Cited

UNITED STATES PATENTS

| 1,426,975 | 8/1922 | Fuscaldo | 180—21 |
| 2,067,546 | 1/1937 | Rocher | 180—21 |
| 2,485,770 | 10/1949 | Place | 180—21 X |

FOREIGN PATENTS

| 273,202 | 4/1914 | Germany. |

A. HARRY LEVY, Primary Examiner

U.S. Cl. X.R.

180—6.48, 22; 280—124